July 30, 1946.    B. N. ASHTON    2,405,006
AUTOMATIC CUTOFF PUMP
Filed Jan. 27, 1944    2 Sheets-Sheet 1

INVENTOR.
Benjamin N. Ashton
BY
Hoguet, Neary & Campbell
ATTORNEYS

July 30, 1946.　　　B. N. ASHTON　　　2,405,006
AUTOMATIC CUTOFF PUMP
Filed Jan. 27, 1944　　　2 Sheets-Sheet 2
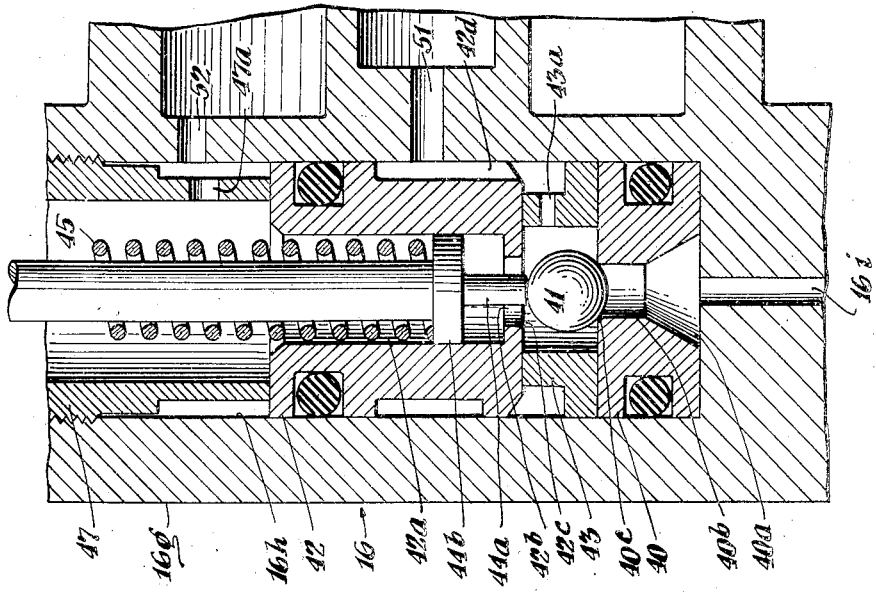
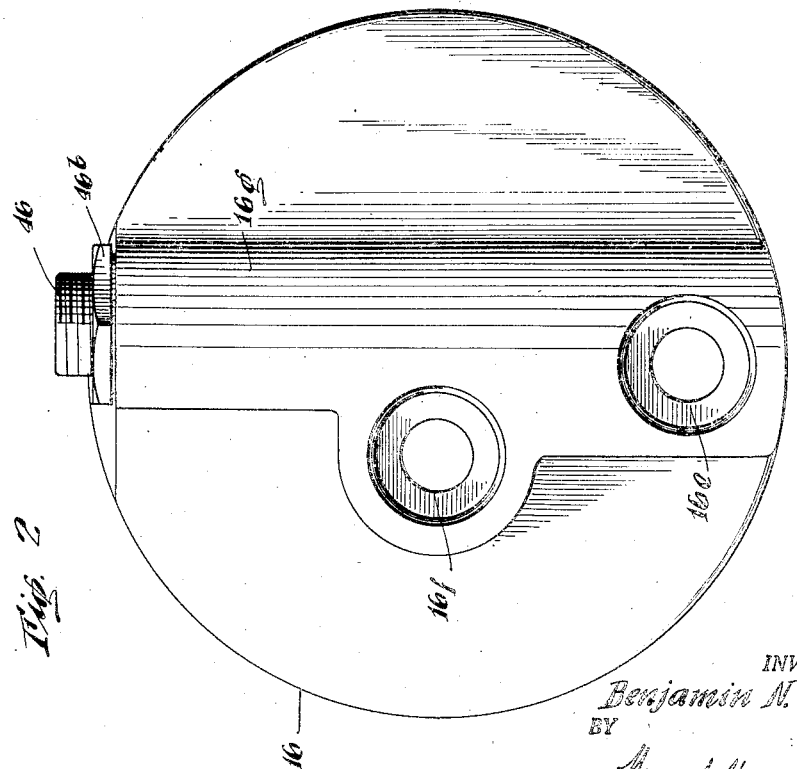
INVENTOR.
Benjamin N. Ashton
BY
Bogues, Meary & Campbell
ATTORNEYS Patented July 30, 1946

2,405,006

UNITED STATES PATENT OFFICE 2,405,006

AUTOMATIC CUTOFF PUMP

Benjamin N. Ashton, Kingston, N. Y., assignor to Electrol Incorporated, Kingston, N. Y., a corporation of Delaware Application January 27, 1944, Serial No. 519,844

6 Claims. (Cl. 103—23)

This invention relates to improvements in pumps and relates more particularly to continuously driven pumps suitable for supplying liquid under pressure to hydraulic systems, such as, for example, the hydraulic systems used in aircraft for actuating retractable landing gear, folding wings, wing flaps and the like.

The pump of such a hydraulic system usually is driven by the aircraft engine and it delivers liquid under pressure at all times during the operation of the engine. Inasmuch as the various hydraulically operated elements of the aircraft are actuated intermittently, the continuously supplied liquid under pressure must be diverted and recirculated in order to avoid excessive pressure in and damage to the hydraulic system.

The liquid usually is diverted and recirculated by means of a device known as an unloading valve, which operates to bypass and return the liquid to a reservoir or to the inlet of the pump when a predetermined pressure has been reached in the system.

An object of the present invention is to provide a pump that is responsive to pressure in a hydraulic system and is capable of maintaining in the system a hydraulic pressure within a predetermined relatively narrow range.

Another object of the invention is to provide a continuously driven pump that automatically ceases pumping when a predetermined liquid pressure is attained in a hydraulic system, and resumes pumping upon a predetermined decrease of the pressure in the system.

A further object of the invention is to provide a positive type of pump having continuously operated driving mechanism that is rendered ineffective to actuate the pumping elements when the pressure in the system attains a predetermined maximum value and in which the pumping elements are rendered effective when the pressure in the system falls below a predetermined value.

Other objects of the invention will become apparent from the following description of typical forms of pumps embodying the present invention.

Pumps of the type embodying the present invention include pumping elements that are actuated by a drive mechanism that is coupled to and driven by a motor or an engine, for example, an aircraft engine. The pump is provided with a pressure-responsive mechanism that is actuated, upon attainment of a desired liquid pressure in an associated hydraulic system, to disconnect the drive mechanism completely from the pumping elements and maintain such a disconnected relationship until the pressure falls to a predetermined lower value.

More particularly, pumps of the type embodying the present invention may include a plurality of cooperating cylinders and pistons provided with suitable intake and discharge ports through which liquid may be drawn and discharged by the action of the pistons. The pistons may be reciprocated by means of a suitable drive mechanism such as a wobble plate that is actuated by means of a cam connected to and driven by the engine so that upon rotation of the cam, the pistons are successively advanced and retracted in their respective cylinders.

The wobble plate may be supported upon a piston member that is displaced by liquid pressure on one side thereof to disengage the wobble plate from the cam. Liquid under pressure may be supplied to displace the piston by means of a valve mechanism that is shifted to an open position by a predetermined fluid pressure in the hydraulic system and maintained in such open position until the pressure in the system drops a predetermined amount.

When the pressure in the system drops to a predetermined value, the valve mechanism is reset to discharge the liquid from behind the wobble plate piston to permit the wobble plate to engage with the actuating cam and actuate the pump pistons.

Pumps of the type described generally above permit the unloading valve and associated conduits of prior systems to be eliminated inasmuch as the pump functions both as a pump and a pressure control mechanism.

For a better understanding of the present invention, reference may be had to the accompanying drawings in which Figure 1 is a view in longitudinal section of a typical form of a pump embodying the present 'nvention;

Figure 2 is an end view of the pump; and

Figure 3 is an enlarged showing of a portion of the pressure-responsive valve of the pump.

Figure 1:
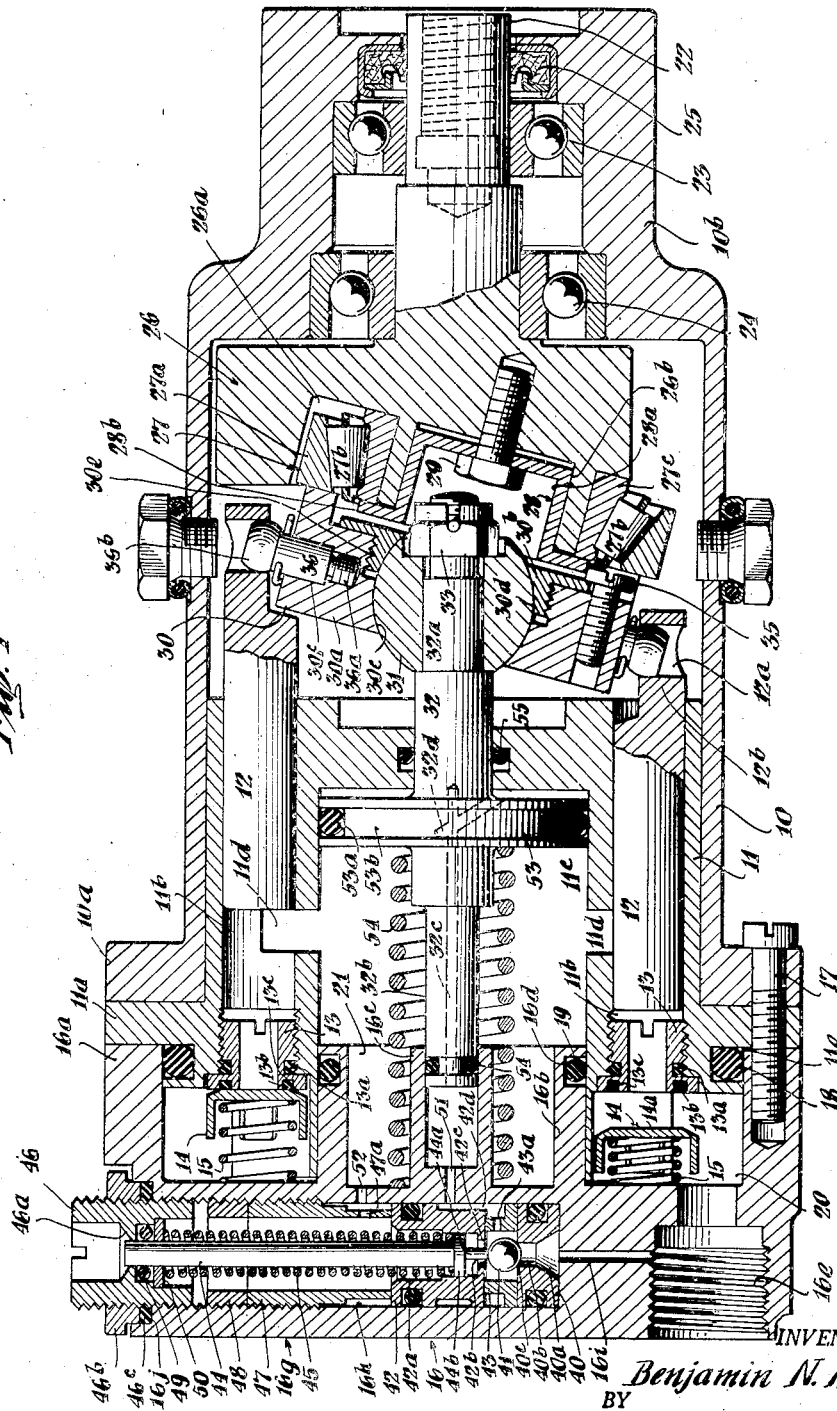

The form of pump chosen to illustrate the invention includes a generally cylindrical housing 10 having a circumferential flange 10a at one end thereof which abuts against a flange 11a on the end of a generally cylindrical pump body portion 11. The pump body portion 11, as illustrated, is provided with a plurality of cylindrical bores 11b forming cylinders disposed around its periphery for receiving the cylindrical pistons 12. The pump body portion 11 is also provided with a cylindrical recess 11c forming another centrally disposed cylinder therein which communicates with each of the pumping cylinders 11b by means of the inlet ports 11d.

At the left hand end of each of the bores 11b is a bushing 13, forming a check valve seat, which is threaded into the member 11 and sealed thereto by a suitable sealing ring 13a. The cooperating element or valve plug 14 of the check valve may consist of a cup-shaped element having a flat or disc-like valve face 14a that cooperates with a sealing ring 13b mounted in a groove 13c in the valve seat 13. Each of the valve plugs 14 is normally urged toward its valve seat 13 by means of a coil spring 15 interposed between the back of the plug 14 and the end closure cap 16 of the pump. When the plug 14 is seated, it engages the sealing ring 13b and the face of the seat 13 inwardly of the ring 13 so that liquid pressure on the ring 13b and the plug 14 provides a strong and complete seal between the plug 14 and the seat 13.

As shown in Figure 2 the cap 16 is generally disc-like in plan and is provided with an annular axially directed flange 16a that abuts against the flange 11a of the pump body. The cap 16, the pump body 11 and the casing 10 may be secured together by means of a plurality of bolts 17 passing through the flanges 10a, 11a and threaded into the flange 16a.

Escape of liquid from between the cap 16 and the flange 11a may be prevented by means of a suitable rubbery sealing ring or gasket 18 received in a groove 11e in the pump body and engaging the flange 16a. The pump cap 16 is provided with an annular flange 16b concentric with the flange 16a and an inner concentric flange 16c forming a cylinder for a purpose to be described. The flange 16b is received telescopically in the cylindrical recess 11c of the pump body and is sealed thereto by means of a sealing ring or gasket 19 mounted in an annular groove 16d in the flange 16b. The annular space 20 between the flange 16a and the flange 16b communicates with a discharge coupling 16e in the cap 16. The coupling 16e is adapted to be connected to a hydraulic system so that the liquid forced from the cylinders 11b through the check valves 13, 14 into the cavity 20 will be delivered directly to the hydraulic system for use in actuating various elements connected therewith.

The cylinder 11c and the space 21 within the flange 16b are connected to an inlet coupling 16f in the cap 16 so that liquid from a reservoir or from the hydraulic system can flow into the cylinder 11c and to the intake ports 11d.

The pistons 12 are actuated by means of a shaft 22 that is driven by a motor or engine. The shaft is journaled in suitable anti-friction bearings 23 and 24 that are mounted in a portion 10b of the casing 10 of reduced diameter. In order to prevent leakage around the shaft, an oil seal 25 of conventional type may be interposed between the shaft and the portion 10b of the casing.

The inner end of the shaft 22 is provided with a counter-balanced driving cam. For example, the shaft 22 may be provided with a counter-balancing member 26 having an eccentric and inclined arcuate recess 26a therein for receiving a roller bearing driving member 27. The driving member 27 may include an outer race 27a supported by a plurality of tapered roller bearings 27b and an inner race member 27c. The inner race 27c is clamped in the recess 26a on the counter-balanced member 26 by means of a flanged, cup-shaped, clamping member 28. The base or cylindrical portion 28a of the member 28 is received in a cylindrical cavity 26b coaxial with the recess 26a and similarly inclined at an angle to the axis of the shaft 22, with its flange 28b overlying the race 27c. The clamping member 28 may be retained in position by means of a bolt 29 threaded into the member 26.

The outer race 27a of the bearing 27 engages a wobble plate 30 that is mounted for rotation and nutation on a ball member 31 mounted on a shaft 32. The shaft 32 is slidably and rotatably mounted in the end of the pump body 11 and extends axially of the cylindrical cavity 11c into the cylinder 16c. The ball 31 is mounted on a reduced portion 32a of the shaft 32 and is retained thereon by means of a nut 33. The wobble plate 30 includes a pair of telescopically assembled disc-like members 30a and 30b having a partially spherical aperture 30c therein for receiving the ball 31. The members 30a and 30b have an interfitting projection 30d and recess 30e and are connected by means of a series of bolts 35 which extend through overlapping portions of the members 30a and 30b.

The wobble plate 30 is provided with a plurality of radially extending openings 30f for receiving the studs 36. Each of the studs 36 is provided with a reduced threaded portion 36a which is threaded into an internally threaded portion of the bores 30f.

The studs 36 have generally spherical heads 36b that are received in transverse openings 12a in the reduced end portions 12b of the pistons 12 so that nutation of the wobble plate 30 will cause the pistons 12 to reciprocate in the cylinders 11b. Thus, upon rotation of the shaft 22, the driving cam 27 will cause nutation of the wobble plate 30 and the pistons will be actuated to draw liquid into the cylinders 11b and discharge the liquid to the hydraulic system.

In order to avoid the development of excessive pressures by the system by the pump, the cap 16 of the pump is provided with a valve mechanism which controls the position of the wobble plate 30 and renders the pistons 12 effective or ineffective to pump, depending upon the pressure in the system.

The valve, together with the inlet port 16f and the discharge port 16e is disposed in a boss or a thickened portion 16g on the cap 16 as shown in Figures 1 and 3 of the drawings. The boss 16g is provided with an axially extending bore 16h which terminates adjacent to the discharge coupling 16e and is connected thereto by means of a small passage 16i. Within the bore 16h is an annular valve seat 40 having a tapered opening 40a communicating with a cylindrical passage 40b defining with the upper face of the member 40 a sharp edged valve seat 40c for a ball valve 41.

A sleeve member 42 is disposed in the bore 16h and is maintained in spaced relationship to the member 40 by means of an annular spacer member 43 of generally L-shaped cross-section.

The member 42 is provided with an enlarged internal bore 42a and a smaller passage 42b that forms with the lower face of the member 42 a sharp edged valve seat 42c for the ball 41. The diameter of the passage 42b is somewhat greater than the diameter of the passage 40b.

The ball 41 is normally urged against the valve seat 40c by means of a plunger 44 which extends axially of the bore 16g and is provided with a reduced end portion 44a that projects through the passage 42b and engages the ball. The plunger 44 is also provided with a flange 44b that is engaged by a coil spring 45 extending between the flange 44b and a member 46 threaded into the outer end of the bore 16g for adjusting the pressure exerted by the spring 45 on the ball 41.

The members 40, 43 and 42 are retained in fixed relationship by means of a tubular sleeve 47 threaded into the bore 16h and retained in fixed position by means of a lock sleeve 48 also threaded into the bore 16h.

The spring adjusting member 46 is provided with an internal flange 46a that closely receives the plunger 44. A resilient sealing ring 49 is interposed between the flange 46a and a ring 50 against which the spring 45 bears to prevent leakage around the plunger 44. The adjusting member 46 may be locked in adjusted position by means of a lock nut 46b threaded on its exterior and engaging a compressible gasket 46c received in a recess 16j at the end of the boss 16g.

The spacer member 43 is provided with one or more radially extending ports or passageways 43a that communicate with a groove 42d in the outer periphery of the member 42 and a passage 51 in the cap member 16 communicating with the space within the tubular member 16c in the interior of the cap 16.

The interior of the cylinder 11c and the space between the flanges 16b and 16c are connected with the interior of the sleeves 47 and 42 by means of a passage 52 and a passage 47a through the sleeve 47.

The valve construction and passages described above are utilized to actuate a piston 53 that is fixed to and carried by the shaft 32 and movable axially of the cylinder 11c. The area of a face of the piston 53 is greater than the combined areas of the faces of the pistons 12. The piston 53 is sealed to the cylinder 11c by means of a rubber sealing ring 53a supported in a peripheral groove 53b in the piston. The piston 53 and the shaft 32 are normally urged toward the right by means of the spring 54 that engages the piston 53 and the cap member 16 and encircles the shaft 32. The shaft 32 extends beyond the piston 53 and is reduced in size to form a piston 32b that is slidably received within the tubular member 16c. The piston 32b is maintained in liquid tight relation to the member 16c by means of a rubber sealing ring 54 and is provided with an axial bore 32c that intersects an inclined passage 32d opening to the exterior of the shaft 32 at the right hand side of the piston 53 so that liquid flowing through the bores 32c and 32d will be discharged into the space between the right hand end of the cylinder 11c and the piston 53. A suitable sealing ring or gasket 55 may be interposed between the cylinder 11c and the casing 10 and encircling the shaft 32 to prevent leakage.

In operation, with the shaft 22 driven continuously, the wobble plate 30 is nutated to reciprocate the pistons 12 in their respective cylinders 11b. Liquid is supplied through the coupling 16f to the cylinder 11c and is drawn into the cylinders 11b through the ports 11d by means of the pistons 12. As the pistons advance past the inlet ports 11d, the liquid is forced out through the check valves 13 and 14 into the space 20 and thence to the discharge coupling 16e. As the pistons retract, the check valves 13, 14 close and a reduced pressure is created in the cylinders, thereby drawing the liquid into the cylinders 11d for subsequent discharge. As the pump continues to operate, the pressure of the liquid in the system is increased to a predetermined value, for example, 1000 lbs. per square inch. When the pressure in the system attains the desired value, the back pressure in the system, acting through the passage 16i will displace the ball 41 from the valve seat 40c against the action of the spring 45. The spring 45 is adjusted or selected so that it will retain the ball 41 on the valve seat 40c until the desired pressure is attained in the system. When this pressure is attained, the spring 45 is compressed and the ball 41 is displaced upwardly as viewed in Figure 1, urging the ball against the valve seat 42c. Inasmuch as this valve seat is of a greater diameter than the valve seat 40c, the effect of the pressure on the ball 41 is considerably increased. Thus the diameter of the seat 42c may be such that the pressure in the system must drop to 900 lbs. per square inch before the spring 45 can return the ball 41 to the seat 40c.

With the ball in its displaced position, liquid flows through the passage 43a, the groove 42d and the passage 51 into the space between the end of the plunger 32b and the annular flange 16c. The liquid also flows through the passage 32c and 32d behind the piston 53, thereby urging the piston to the left against the action of the spring 54 and moving the wobble plate 30 out of engagement with the drive member 27. In the form of the invention illustrated, the wobble plate 30 will engage the end of the pump body portion 11 and will be rocked into a position substantially perpendicular to the axis of the shaft 32. This movement of the wobble plate advances all of the pistons 12 to the left where they are retained so long as the ball 41 is displaced from the seat 40c.

When the pressure at the discharge port or coupling 16e decreases sufficiently, the spring 45 and plunger 44 displace the ball from the valve seat 42c and return it to engagement with the seat 40c. In this position, the liquid behind the piston 53 flows through the passages 32d, 32c, the passage 51, the passage 43a, the port 42b, through the ports 47a and 52 and into the cylinder 11c. This releases the pressure behind the piston 53 and permits the spring 54 to move the piston to the right, thereby reengaging the wobble plate 30 with the driving mechanism 27 and causing a resumption of the pumping operation.

The above described construction, therefore, provides a pump which automatically cuts off at a predetermined pressure and resumes pumping at a lower predetermined pressure, thereby doing away with the necessity of providing a separate unloading valve for a hydraulic system, while assuring that the pressure in the hydraulic system will remain within a desired operating range.

While the invention has been described with reference to a piston type of pump, it will be understood that it may be utilized in conjunction with other types of positive acting pumps. Therefore, the form of the invention as described above should be considered as illustrative and not as limiting the scope of the following claims.

I claim:

1. An automatic cut-off pump comprising at least one pump cylinder having an inlet and an outlet, a piston reciprocable in said cylinder to draw liquid into said cylinder through said inlet and discharge liquid through said outlet, rotary driving means, a wobble plate actuated by said rotary driving means for reciprocating said piston, and means responsive to a predetermined liquid pressure at the outlet of said cylinder for shifting said wobble plate out of engagement with said rotary driving means to render that latter ineffective to reciprocate said piston, said pressure responsive means being responsive to a lower pressure than said predetermined pressure to shift said wobble plate into engagement with said rotary driving means to render the latter effective to reciprocate said piston.

2. An automatic cut-off pump comprising a cylinder having an inlet and an outlet, a piston reciprocable in said cylinder to draw liquid into said cylinder through said inlet and discharge liquid from said outlet under pressure, a rotary cam member adjacent one end of said piston, a power transmitting element engaging said piston and said cam member for reciprocating said piston in response to rotation of said cam, and means responsive to a predetermined liquid pressure at said outlet for moving said power transmitting element out of engagement with said cam to terminate reciprocation of said piston.

3. An automatic cut-off pump comprising a pump body having a plurality of substantially parallel cylinders radially spaced about the axis of said body, pistons reciprocable in said cylinders for drawing liquid into said cylinders and discharging liquid to a hydraulic system, a driving member having a face inclined to the axes of said body and said cylinders, and adjacent to the end of each of said pistons, a wobble plate operated by said member interposed between said end of each piston and said driving member, means urging said end of each piston toward said driving member, means for rotating said driving member and said body relatively to cause nutation of said wobble plate to reciprocate said pistons in said cylinders, and means responsive to a predetermined pressure in said hydraulic system for shifting said wobble plate to move said ends of said pistons into a plane substantially perpendicular to the axis of said body to render relative rotation of said body and said driving member ineffective to reciprocate said pistons.

4. An automatic cut-off pump comprising at least one cylinder having an inlet and an outlet, a piston reciprocable in said cylinder for admitting liquid through said inlet into said cylinder and discharging liquid under pressure through said outlet, a rotatable member having a face inclined to the axis of said cylinder, a wobble plate connected to said piston, means supporting and urging said plate against said inclined face to reciprocate said piston upon rotation of said member, and means responsive to a predetermined pressure at said outlet for shifting said wobble plate out of engagement with said rotatable member, said means retaining said wobble plate in shifted position until the pressure in said system drops to a predetermined lower value.

5. An automatic cut-off pump comprising at least one cylinder having an inlet and an outlet, a piston reciprocable in said cylinder for admitting liquid through said inlet into said cylinder and discharging liquid under pressure through said outlet, a rotatable member having a face inclined to the axis of said cylinder, a wobble plate connected to said piston, means supporting and urging said plate against said inclined face to reciprocate said piston upon rotation of said member, a piston on said supporting and urging means, a cylinder for said last-mentioned piston, a valve having a first port connected with said outlet and the last-mentioned cylinder, a second port connected with said last-mentioned cylinder and said inlet, a valve member for sealing either of said ports and means normally urging said valve member into said first port, whereby displacement of said valve member from said first port by liquid pressure at said outlet admits liquid to said last-mentioned cylinder to displace said wobble plate from engagement with said inclined face, and displacement of said valve member from said second port discharges liquid from said last-mentioned cylinder to reengage said wobble plate with said inclined face.

6. An automatic cut-off pump comprising a pump body having a substantially centrally disposed cylinder and a plurality of substantially parallel smaller cylinders disposed radially outwardly of said centrally disposed cylinder, each having an inlet and an outlet, a piston in each of said smaller cylinders, a larger piston in said centrally disposed cylinder, a shaft projecting from said larger piston, a wobble-plate mounted for nutation on said shaft and connected to each of the pistons in said smaller cylinders, a rotatable driving member having an inclined face adjacent to said wobble plate for nutating the latter to reciprocate said pistons in said smaller cylinders, means urging said wobble-plate and large piston toward said driving member, a two-position valve having a first port connecting said centrally disposed cylinder with the outlets of said smaller cylinders to deliver liquid under pressure to displace said larger piston in opposition to said urging means, a second larger port connecting the centrally disposed cylinder with said inlets to discharge liquid from said centrally disposed cylinder to said inlets, a valve member for sealing said ports alternately, and means normally urging said valve member into sealing relation with said first port.

BENJAMIN N. ASHTON.